(12) United States Patent
Riefe

(10) Patent No.: US 8,764,064 B2
(45) Date of Patent: Jul. 1, 2014

(54) STEERING COLUMN ASSEMBLY WITH IMPROVED ENERGY ABSORPTION SYSTEM

(71) Applicant: Steering Solutions IP Holding Corporation, Saginaw, MI (US)

(72) Inventor: Richard K. Riefe, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 34 days.

(21) Appl. No.: 13/690,627

(22) Filed: Nov. 30, 2012

(65) Prior Publication Data

US 2014/0150594 A1 Jun. 5, 2014

(51) Int. Cl.
*B62D 1/00* (2006.01)

(52) U.S. Cl.
USPC ............................ 280/777; 280/775; 280/776

(58) Field of Classification Search
USPC .................................. 280/775, 776, 777, 779
See application file for complete search history.

(56) References Cited

U.S. PATENT DOCUMENTS

| | | | |
|---|---|---|---|
| 3,948,497 A | 4/1976 | Lovitt et al. | |
| 5,375,881 A | 12/1994 | Lewis | |
| 5,487,562 A | 1/1996 | Hedderly et al. | |
| 5,605,352 A | 2/1997 | Riefe et al. | |
| 5,706,704 A * | 1/1998 | Riefe et al. | 74/493 |
| 5,788,278 A | 8/1998 | Thomas et al. | |
| 5,803,496 A * | 9/1998 | Cymbal | 280/777 |
| 6,378,939 B1 | 4/2002 | Knoll et al. | |
| 6,454,302 B1 | 9/2002 | Li et al. | |
| 6,575,497 B1 * | 6/2003 | McCarthy et al. | 280/777 |
| 6,655,716 B2 | 12/2003 | Riefe | |
| 7,325,834 B2 * | 2/2008 | Manwaring et al. | 280/777 |
| 7,445,181 B2 | 11/2008 | Knoll et al. | |
| 7,455,320 B2 | 11/2008 | Imamura et al. | |
| 7,896,395 B2 * | 3/2011 | Cymbal et al. | 280/777 |
| 8,033,574 B2 * | 10/2011 | Menjak et al. | 280/777 |
| 2002/0036404 A1 * | 3/2002 | Li et al. | 280/777 |
| 2003/0042723 A1 * | 3/2003 | Riefe | 280/777 |
| 2003/0071451 A1 * | 4/2003 | Riefe et al. | 280/777 |
| 2003/0075912 A1 * | 4/2003 | Riefe et al. | 280/777 |
| 2003/0102658 A1 * | 6/2003 | McCarthy et al. | 280/777 |
| 2004/0164538 A1 * | 8/2004 | Li et al. | 280/777 |
| 2004/0217581 A1 * | 11/2004 | Dubay et al. | 280/777 |
| 2005/0029794 A1 * | 2/2005 | Riefe et al. | 280/777 |
| 2005/0189757 A1 * | 9/2005 | Li et al. | 280/777 |
| 2005/0194777 A1 * | 9/2005 | Manwaring et al. | 280/777 |
| 2006/0021460 A1 * | 2/2006 | Schulz | 74/493 |
| 2008/0111363 A1 * | 5/2008 | Menjak et al. | 280/777 |
| 2009/0090210 A1 | 4/2009 | Menjak et al. | |
| 2010/0032933 A1 * | 2/2010 | Cymbal et al. | 280/777 |
| 2013/0068741 A1 | 3/2013 | Pillai et al. | |

* cited by examiner

*Primary Examiner* — Toan To
(74) *Attorney, Agent, or Firm* — Cantor Colburn LLP

(57) ABSTRACT

A steering column assembly for a vehicle comprises a column jacket and an energy absorption system. The column jacket is configured to undergo a collapse event involving a translation of the column jacket along a longitudinal axis in response to application of a column compression force. The energy absorption system includes an anvil coupled to the vehicle and a strap coupled to the column jacket with the strap extending through the anvil such that the strap is drawn over the anvil in response to the collapse event. The strap is configured to cause: (a) a friction force to be created between the strap and the anvil; and (b) a deformation force to be created between the strap and the anvil. The strap is configured such that at least one of the friction force and the deformation force varies along the length of the strap.

20 Claims, 7 Drawing Sheets

STEERING COLUMN ASSEMBLY WITH IMPROVED ENERGY ABSORPTION SYSTEM

BACKGROUND OF THE INVENTION

The subject invention generally relates to a steering column assembly for a vehicle, and more specifically to a collapsible steering column assembly having an energy absorption system for absorbing energy during collapse of the steering column assembly.

A vehicle steering column assembly may include an energy absorption system for dissipating kinetic energy during an impact between a vehicle occupant and the steering column. An energy absorption system may thereby reduce the likelihood or severity of an injury to the vehicle operator in the event of a collision involving the vehicle. For example, in a front end collision interrupting the forward progress of the vehicle, a vehicle occupant impacting the steering wheel may impose a column compression force upon the steering column. If the column compression force is of sufficient magnitude, a collapse of the steering column along its longitudinal axis may be encountered.

An energy absorption system may be implemented and configured so as to deliver a collapse resistance force that tends to oppose the column compression force. To overcome the collapse resistance force, an input of work (i.e., energy) is required as the steering column collapses, and the steering column is thus able to "absorb" the energy (i.e., work) in overcoming the collapse resistance force as that energy is expended throughout the collapse stroke. This release of energy over the finite period of time required to traverse the collapse stroke, as apposed to the instantaneous release of energy that would be associated with an impact with a rigid body, results in a substantial decrease in the magnitude of the impulse encountered by the vehicle occupant in the event of a vehicle collision.

As one skilled in the art will appreciate, a collapsible steering column assembly may include a housing configured to translate linearly through a collapse stroke. As soon as the steering column has been released from its relatively fixed position with respect to the vehicle, energy absorption during the collapse stroke becomes feasible. Accordingly, when a vehicle occupant first impacts the steering wheel and exerts a sufficient break-away force on the steering column (or as soon as a collision event has been detected and the steering column is automatically released), a force exerted by the occupant upon the steering column (i.e., column compression force) is available to perform work. One skilled in the art will appreciate that the force exerted by the occupant on the steering column is related to not only the rate at which the column mass is accelerated by the force exerted by the occupant, but also to the force that resists the collapse of the steering column. This collapse resistance force may be created and controlled by an energy absorption system, which is designed to dissipate a portion of the occupant's kinetic energy.

In general, the collapse resistance force may be created through a variety of means, including by causing a strap to be drawn through or over a path or surface of resistance as the housing of the collapsible steering column assembly translates through the collapse stroke. As the strap passes through the path or over the surface, the strap may be deformed, friction may be encountered between the strap and the surface, and/or other mechanisms may be employed for resisting the relative movement between the strap and the surface.

Typically, a collapsible steering column assembly includes a column jacket having two ends; a steering wheel end and an output end. A bracket is mounted to the column jacket for attaching the column jacket to the vehicle, and one or more release modules interconnect the bracket to the vehicle. The release modules may be configured to release the interconnection between the column jacket and the vehicle upon the occurrence of a predetermined event, such as a vehicle collision. A release module may include a bore, through which a fastener, such as a bolt, passes through to mechanically couple the release module to the vehicle. A strap may be connected to the bracket for movement with the bracket and the column jacket during the collapse stroke. The strap passes through a deformation device, such as an anvil that defines a strap channel. Thus, during the collapse stroke, the strap is deformed or otherwise caused to encounter a collapse resistance force imparted by the anvil. A deformation channel may be incorporated into the release module.

Accordingly, it is desirable to have a steering column assembly with an energy absorption system that can facilitate reliable, cost-effective control over the collapse resistance force. It would also be advantageous to have a steering column assembly with an energy absorption system that provides for variations in the collapse resistance force at different stages of a collapse stroke.

SUMMARY OF THE INVENTION

In one exemplary embodiment of the invention, a steering column assembly for a vehicle comprises a column jacket and an energy absorption system. The column jacket is configured to undergo a collapse event involving a translation of the column jacket along a longitudinal axis in response to application of a column compression force following the occurrence of a predefined event. The energy absorption system includes an anvil coupled to the vehicle and a strap coupled to the column jacket with the strap extending through the anvil such that the strap is drawn over the anvil in response to the collapse event. The strap is configured to cause: (a) a friction force to be created between the strap and the anvil so as to resist relative movement between the strap and the anvil during the collapse event; and (b) a deformation force to be created between the strap and the anvil so as to resist relative movement between the strap and the anvil during the collapse event. The strap is configured such that at least one of the friction force and the deformation force varies along the length of the strap.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
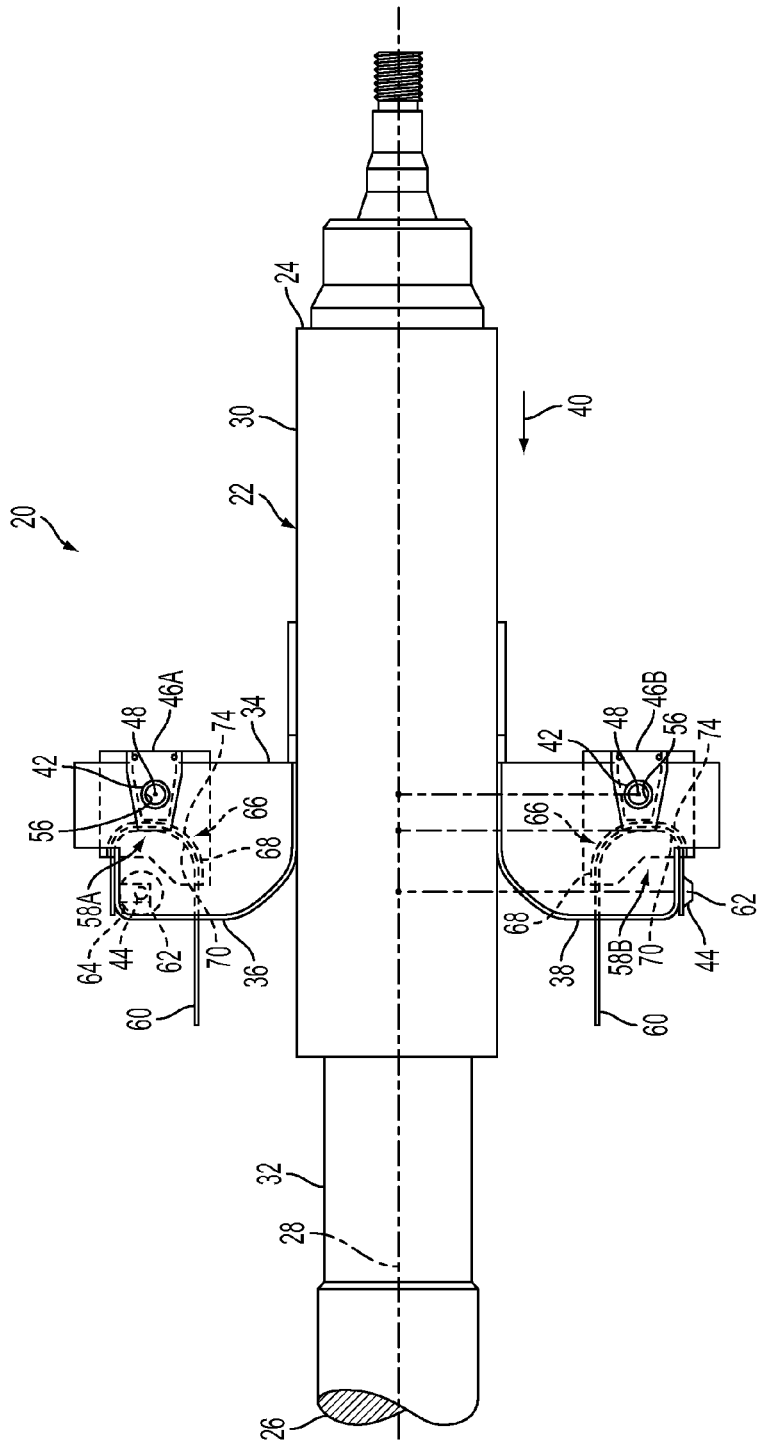
FIG. 1 shows a top plan view of a collapsible steering column assembly.
Figure 2:
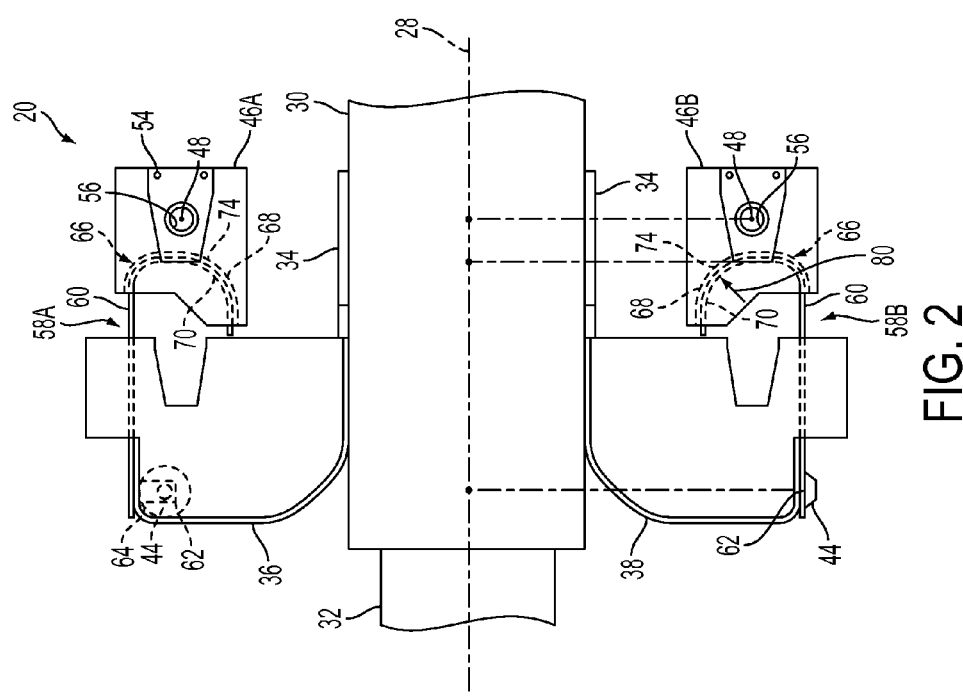
FIG. 2 shows an enlarged fragmentary top plan view of the collapsible steering column assembly.

Referring now to the Figures, where the invention will be described with reference to specific embodiments, without limiting same, FIGS. 1 and 2 show a steering column assembly 20 exemplifying the present invention. The steering column assembly 20 is for a vehicle, and is collapsible in response to a collision event. The steering column assembly 20 includes a column jacket 22. The column jacket 22 includes an input end 24 and an output end 26. A steering shaft is supported for rotation within the column jacket 22. A steering wheel (not shown) is connected to the steering shaft near the input end 24 of the column jacket 22. The column jacket 22 and the steering shaft define a longitudinal axis 28. The column jacket 22 includes an upper jacket 30 and a lower jacket 32.

Figure 3:
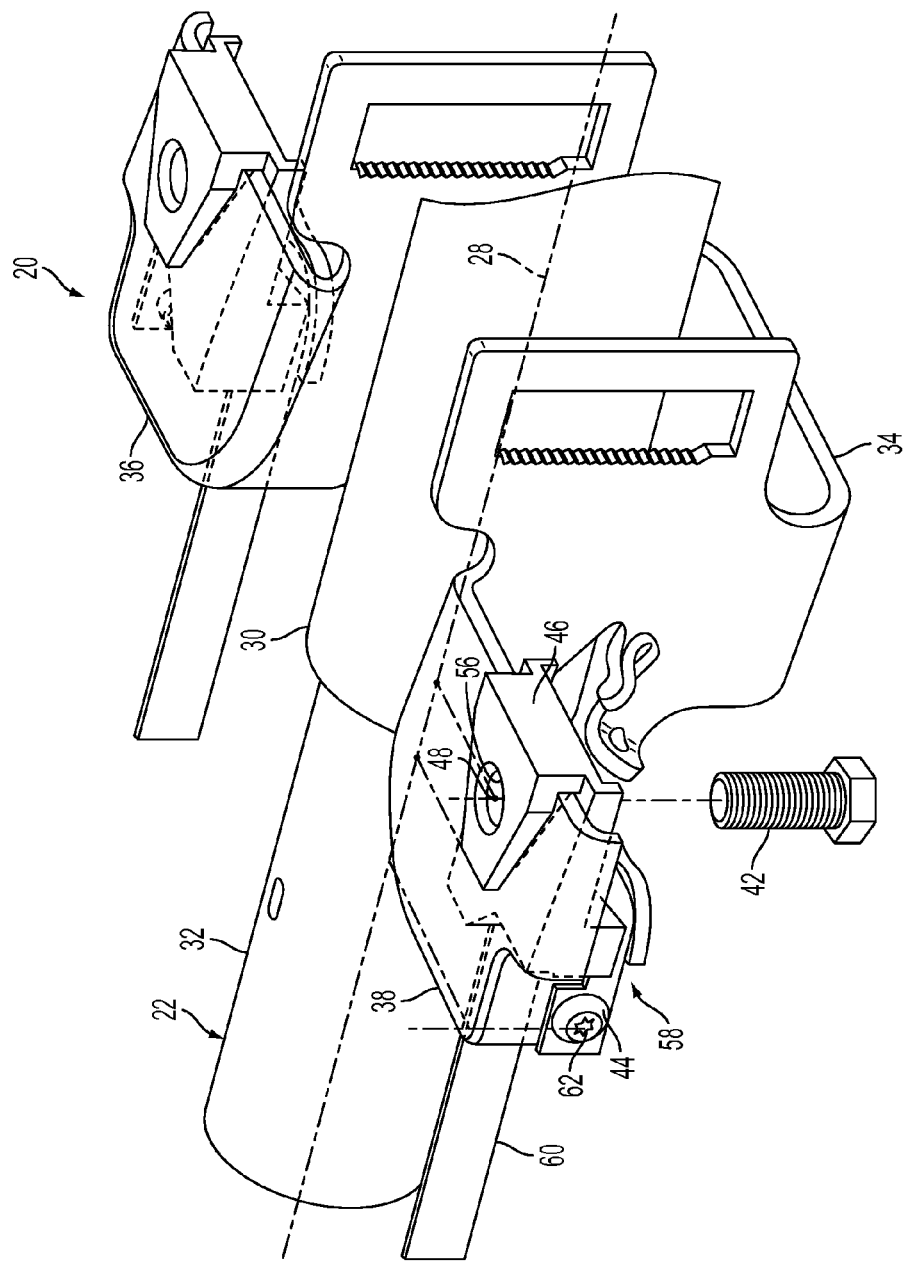
FIG. 3 shows a fragmentary perspective view of the steering column assembly prior to collapse.
Figure 4:
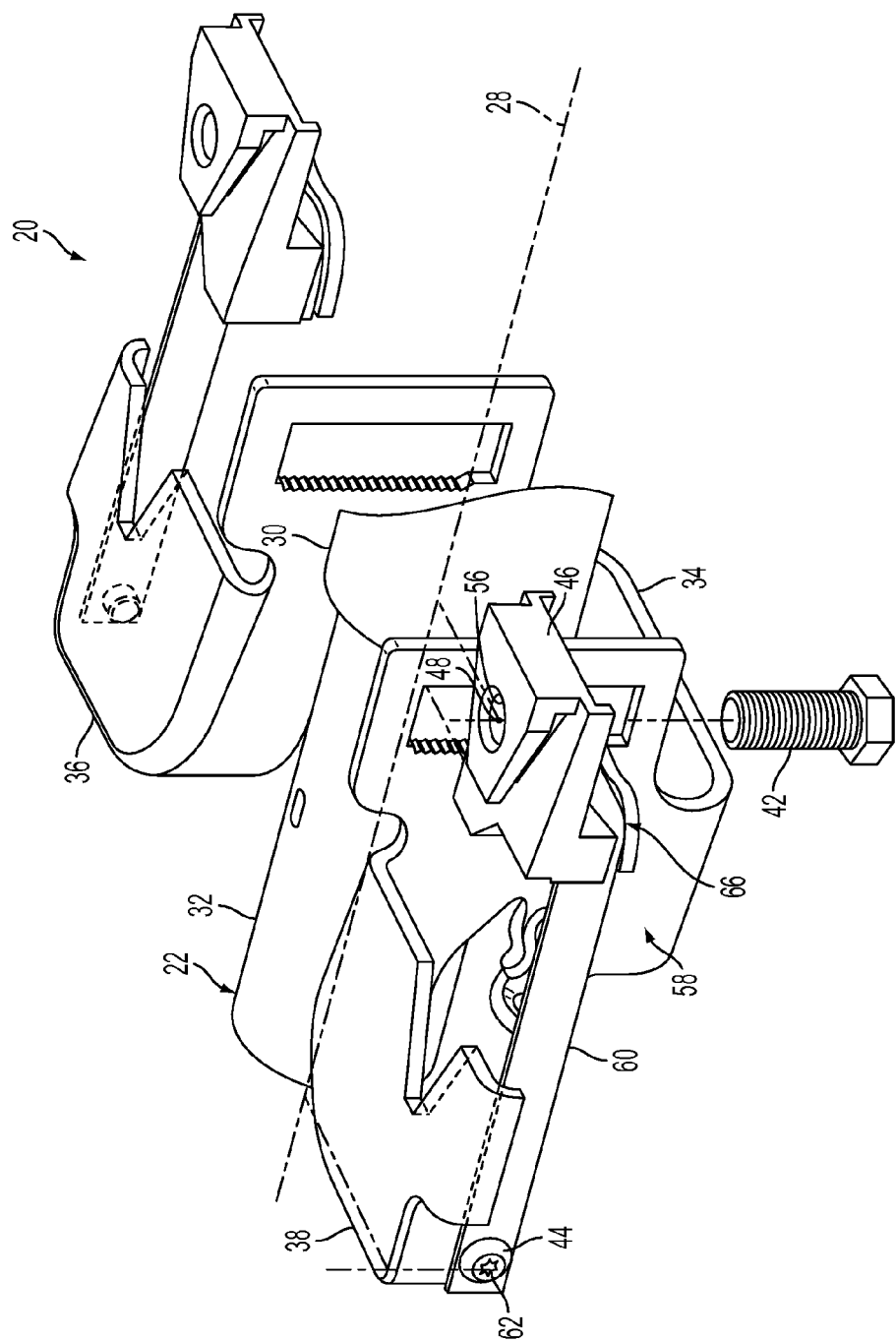
FIG. 4 shows a fragmentary perspective view of the steering column assembly post collapse.

The steering column assembly 20 is configured to collapse along the longitudinal axis 28 (through a collapse stroke) as the input end 24 moves toward the output end 26 in response to a force applied between the input end 24 and the output end 26 (e.g., as an operator of the vehicle applies the force to the steering wheel and pushes the column jacket 22 along the longitudinal axis 28 toward the output end 26 of the column jacket 22). FIGS. 1 and 3 show the steering column assembly 20 prior to such a collapse, while FIGS. 2 and 4 show the steering column assembly 20 after an exemplary collapse of the steering column assembly 20. It should be appreciated that a collision event may be caused by a vehicular crash and may involve transmission of a force to the steering wheel by an operator of the vehicle, the force being transmitted to the steering column assembly 20.

With further reference to FIG. 1 and FIG. 2, the column jacket 22 includes a bracket 34 that is fixed to the column jacket 22. In an exemplary embodiment, the bracket 34 is attached to the upper jacket 30 and is moveable with the upper jacket 30 along the longitudinal axis 28 during the collapse stroke. The bracket 34 may include a first extension 36 and a second extension 38 extending in a radial outward direction from opposing sides of the column jacket 22. The column jacket 22 and the bracket 34 are moveable along the longitudinal axis 28 in response to the collision event in a direction indicated by arrow 40. The bracket 34 may be integrally formed with the column jacket 22 or may be connected to the column jacket 22 by welding or by any other suitable manner known in the art.

A release module 46 includes a connection point 48 for reliably connecting the release module 46 to the vehicle, and the column jacket 22 is selectively coupled to the release module 46. In an exemplary embodiment, the release module 46 is selectively coupled to the bracket 34, which provides the connection to structural connection to the column jacket 22. The release module 46 is coupled to the column jacket 22 in such a manner that the release module 46 remains coupled to the column jacket 22 prior to the occurrence of a predetermined event (e.g., a vehicle collision) but is selectively released from the column jacket 22 upon the occurrence of the predetermined event. When the release module 46 is released, a longitudinal collapse of the column jacket 22 is accommodated such that the bracket 34 is permitted to move relative to the release module 46 as the column jacket 22 and the bracket 34 move through the collapse stroke.

In an exemplary embodiment, the release module 46 is configured to couple the bracket 34, and thus the column jacket 22, to the vehicle prior to a release (e.g., prior to a collision event), and to release the bracket 34 (and thus the column jacket 22) from the vehicle as the bracket 34 and the column jacket 22 move along the longitudinal axis 28. For example, the release module 46 may include a number of sheer pins 54 configured to fracture under imposition of a predefined load, enabling the column jacket 22 to move along the longitudinal axis 28 relative to the release module 46. However, it should be appreciated that the release module 46 may be coupled to the bracket 34 or the column jacket 22 in some other suitable fashion. The release module 46 may include a first release module 46A releasably coupled to the first extension 36 and a second release module 46B releasably coupled to the second extension 38.

While the column jacket 22 (and/or the bracket 34) is configured to be selectively released from the release module 46 upon the occurrence of a predetermined event, the release module 46 remains fixed to the vehicle. In an exemplary embodiment, the release module 46 defines a bore 56 aligned with the connection point 48, through which a release module fastener 42 extends for fixing the release module 46 to the vehicle.

The steering column assembly 20 also includes an energy absorption system 58. The energy absorption system 58 interconnects the bracket 34, and the column jacket 22, to the release module 46 and thus to the vehicle. The energy absorption system 58 includes a strap 60. The strap 60 is secured directly or indirectly to the column jacket 22 and includes an attachment 62 and/or a strap fastener 44 to facilitate such attachments. In an exemplary embodiment, the strap 60 is selectively coupled to the bracket 34 and to the column jacket 22 to facilitate a dual mode energy absorption system 58, in which a first mode facilitates energy absorption during collapse of the column jacket 22, and a second mode facilitates free collapse of the column jacket 22.

In an exemplary embodiment, an actuator 64 is attached to the bracket 34 in order to selectively couple the strap 60 to the bracket 34. A controller (not shown) signals the actuator 64 to couple the strap 60 to the bracket 34 if desired. The actuator 64, if signaled, may move the strap fastener 44, such as a pin, through an aperture in the strap 60 to connect the strap 60 to the bracket 34. The actuator 64 may include a pyrotechnic device or some other suitable device. However, it should be appreciated that the strap 60 may be selectively coupled to the bracket 34 by other means known in the art.

Figure 5:
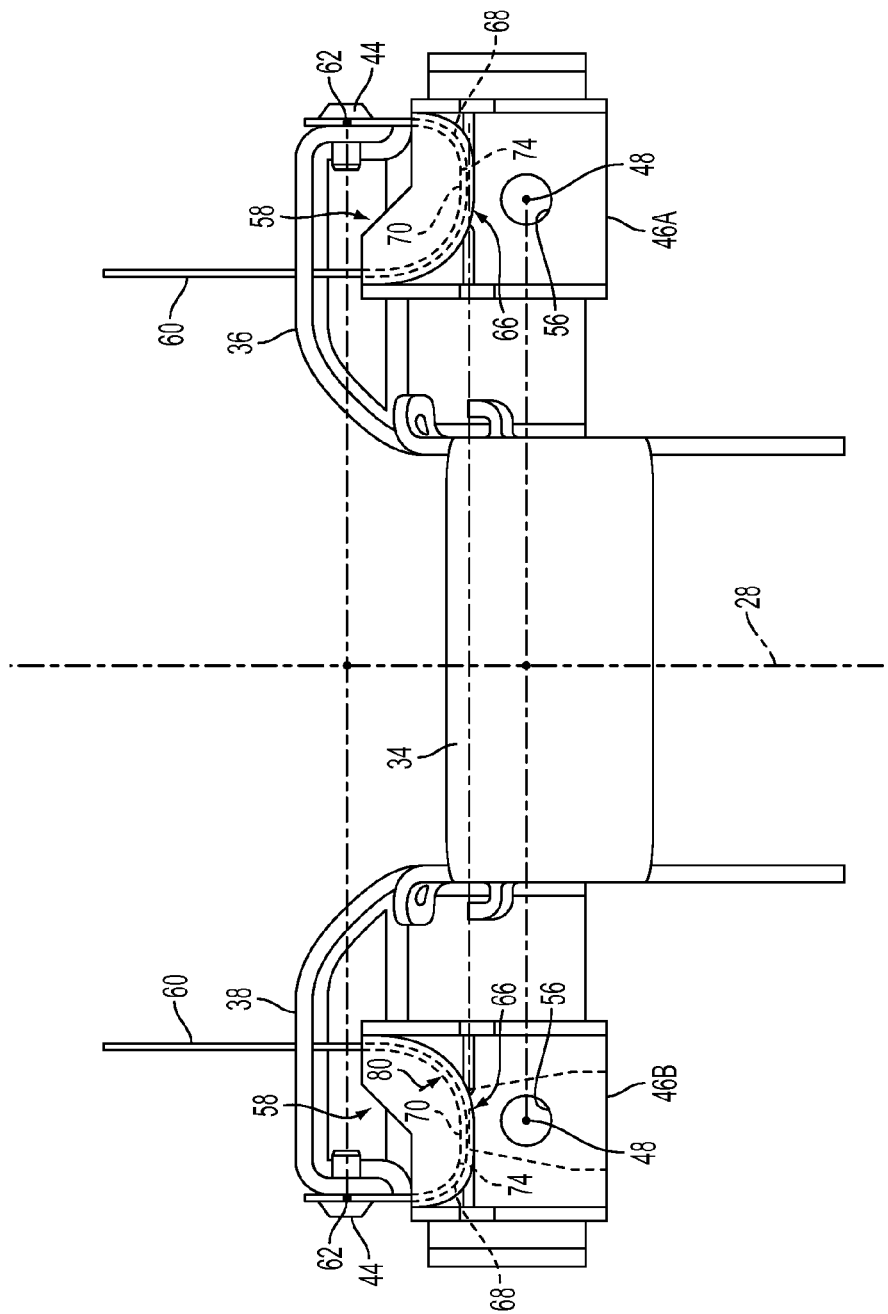
FIG. 5 shows a partial lower plan view of the steering column assembly showing two release modules coupled to a bracket.

As shown in FIG. 5, the energy absorption system 58 further includes a deformation device 66. The deformation device 66 includes a channel 68 defining an anvil 70. The channel 68 and the anvil 70 are disposed on the release module 46. The strap 60 is disposed within and extends through the channel 68. As the column jacket 22 moves along the longitudinal axis 28 (e.g., during a collapse of the column jacket 22), the strap 60 is drawn through and deformed by the channel 68. FIGS. 1, 3 and 5 show the strap 60 prior to being drawn through the channel 68. FIG. 2 and FIG. 4 show the strap 60 after the strap 60 has been drawn through the channel 68.

As described above, the channel 68 defines and includes the anvil 70, about which the strap 60 is deformed as the strap 60 is drawn through the channel 68. The anvil 70 is disposed on the release module 46. The channel 68 and the anvil 70 may include any suitable shape. As shown, the channel 68 and the anvil 70 generally define a U-shape. However, it should be appreciated that the resistance provided by the energy absorption system 58 is determined by the amount of energy required to deform the strap 60 as the strap 60 is drawn through the channel 68. Accordingly, a more complex channel 68 having more and/or smaller radius bends, increases the amount of energy required to deform the strap 60 and thereby increases the resistance provided against movement of the column jacket 22.

The steering column assembly 20 may include one or more energy absorption systems 58. If multiple energy absorption systems 58 are utilized, then one or more of the energy absorption systems 58 may be selectively coupled to the bracket 34 as described above to provide multiple stages of resistance. The steering column assembly 20 includes a first energy absorption system 58A and a second energy absorption system 58B with the strap 60 of the first energy absorption system 58 fixedly connected to the bracket 34 and the strap 60 of the second energy absorption system 58 selectively coupled to the bracket 34. Accordingly, the first energy absorption system 58A will always be available to resist movement of the column jacket 22, while the second energy absorption system 58B may be selectively engaged if desired.

It should be appreciated that control over the force that resists the collapse of a steering column along the collapse stroke (i.e., the collapse resistance force) may be provided by manipulating a number of aspects of the construction of the steering column. A particularly convenient aspect to facilitate manipulation of the collapse resistance force relates to the interaction of the strap 60 and the anvil 70. One mechanism for dissipating energy involves the deformation of the strap 60, which occurs as the strap 60 is pulled over the anvil 70. Another mechanism involves friction between the strap 60 and the anvil 70.

Figure 6:
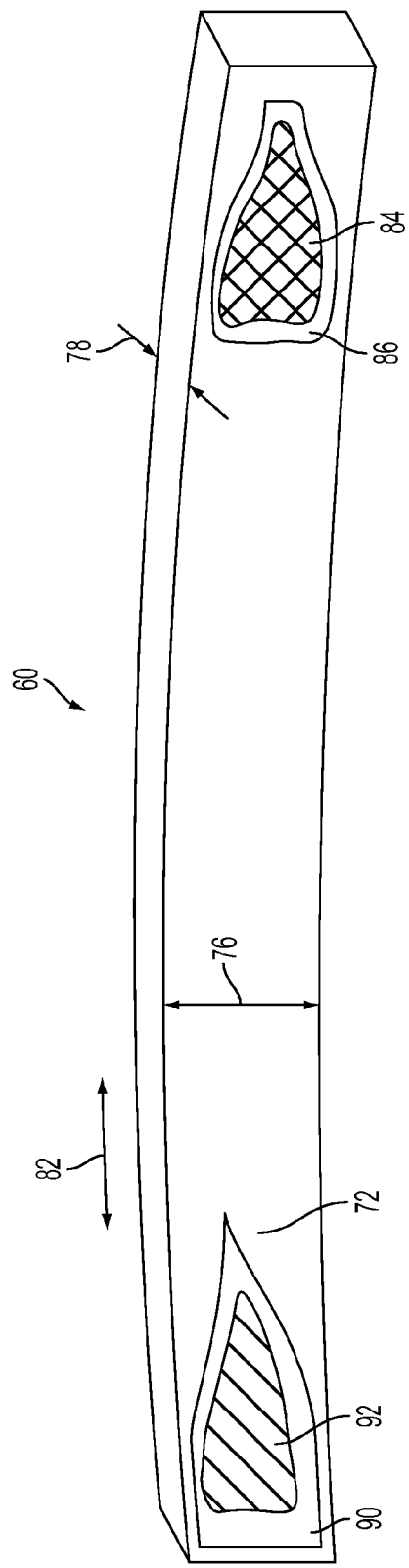
FIG. 6 shows a side view of an exemplary strap of an energy absorption system of a collapsible steering column assembly.
Figure 7:
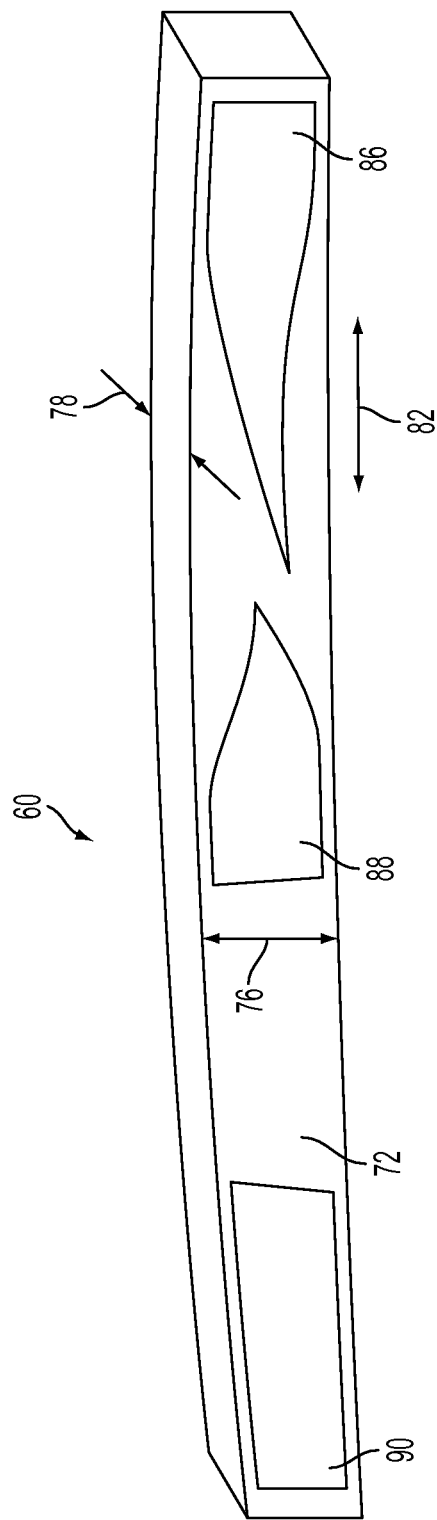
FIG. 7 shows a side view of an exemplary strap of an energy absorption system of a collapsible steering column assembly.

In regard to the mechanism involving deformation of the strap 60, relevant parameters for manipulation of the collapse resistance force include, as depicted in FIG. 6 and FIG. 7, the yield strength of the strap 60, the cross-sectional dimensions (i.e., width 76, thickness 78) of the strap 60, and the curvature (e.g., radius 80) of the anvil 70. In regard to the mechanism involving friction between the strap 60 and the anvil 70, relevant parameters for manipulation of the collapse resistance force include the coefficients of friction between the surface 72 of the strap 60 and the surface 74 of the anvil 70, the area of the strap 60 in contact with the anvil 70, and the pressure (i.e., normal force) between the strap 60 and the anvil 70.

In an exemplary embodiment, a collapse resistance force is varied along a collapse stroke by varying the width 76 of the strap 60 along the lengthwise direction 82 of the strap 60. In another exemplary embodiment, a collapse resistance force is varied along a collapse stroke by varying the thickness 78 of the strap 60 along the lengthwise direction 82 of the strap 60. In an exemplary embodiment, the strap 60 is deformable plastically. Thus, the strap 60 may comprise a plastically deformable material such as metal.

In another exemplary embodiment, a collapse resistance force is varied along a collapse stroke by varying the surface finish, i.e., smoothness, and therefore the coefficient of friction, between the surface 72 of the strap 60 and the surface 74 of the anvil 70) between the strap 60 along the lengthwise direction 82 of the strap 60.

In another exemplary embodiment, a collapse resistance force is varied along a collapse stroke by applying a relatively lower friction material 84, such as PTFE, or a smoothed finish, to selected regions 86 along the length of the strap 60. For example, a first region 86 may be coated with a low friction coating 84 and may be positioned so that the first region 86 interacts with the anvil 70 near a beginning of the collapse stroke. As a result, an exemplary strap 60 may be configured so as to produce a relatively low collapse resistance force at the initiation of the collapse stroke.

In another exemplary embodiment, a second region 88 may be coated with a low friction coating 84 and may be positioned so that the second region 88 interacts with the anvil 70 near a desired portion of the collapse stroke such as a middle of the collapse stroke. As a result, an exemplary strap 60 may be configured so as to produce a relatively low collapse resistance force at the relevant portion of the collapse stroke such as the middle of the collapse stroke. One skilled in the art will appreciate that the selective application of low friction coatings at selected locations along the length of the strap 60 may this be used so as to configure the strap 60 to produce a desired collapse resistance force profile along the collapse stroke. Thus, the strap 60 may be configured to provide a resistance force characteristic that is tailored for absorbing lesser levels of energy as may be associated with lighter weight vehicle occupants and/or associated with lower velocity collisions. At the same time, the strap 60 may be configured to provide a collapse resistance force characteristic that is tailored for absorbing greater levels of energy as may be associated with heavier vehicle occupants and/or associated with greater velocity collisions.

In addition to manipulating the position of the first region 86 or the second region 88, the dimensions of each of the first region 86 or the second region 88 may also be manipulated to suit specific needs for a particular collapse resistance force characteristic. For example, a region 86, 88 may be configured to provide only partial coverage of the width 76 of the strap 60, and the size and shape of the region 86, 88 may be configured so as to increase or decrease gradually, providing a smooth transition toward increasing collapse resistance force or a smooth transition from greater collapse resistance force to lesser collapse resistance force.

In another exemplary embodiment, a third region 90 may be treated so as to provide for increased friction relative to other regions of the strap 60. For example, the third region 90 may be coated with a relatively greater friction material 92 such as tar or rubber or may be finished with a roughened, sanded, or treaded surface. The third region 90 may be positioned so that the third region 90 interacts with the anvil 70 near a desired portion of the collapse stroke such as a middle of the collapse stroke. As a result, an exemplary strap 60 may be configured so as to produce a relatively higher collapse resistance force at the relevant portion of the collapse stroke such as the middle or later stage of the collapse stroke.

One skilled in the art will appreciate that the selective application of increased friction coating or surface finish at selected locations along the length of the strap 60 may this be used so as to configure the strap 60 to produce a desired collapse resistance force profile along the collapse stroke. Thus, the strap 60 may be configured to provide a collapse resistance force characteristic that is tailored for absorbing lesser levels of energy as may be associated with lighter weight vehicle occupants and/or associated with lower velocity collisions. At the same time, the strap 60 may be configured to provide a collapse resistance force characteristic that is tailored for absorbing greater levels of energy as may be associated with heavier vehicle occupants and/or associated with greater velocity collisions.

In addition to manipulating the position of the third region 90, the dimensions of the third region 90 may also be manipulated to suit specific needs for a particular collapse resistance force characteristic. For example, the third region 90 may be configured to provide only partial coverage of the width 76 of the strap 60, and the size and shape of the third region 90 may be configured so as to increase or decrease gradually, providing a smooth transition toward increasing collapse resistance force or a smooth transition from greater collapse resistance force to lesser collapse resistance force.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly for a vehicle, the assembly comprising:
   a column jacket configured to undergo a collapse event involving a translation of the column jacket along a longitudinal axis in response to application of a column compression force following the occurrence of a predefined event;
   an energy absorption system including an anvil coupled to the vehicle and a strap coupled to the column jacket with the strap extending through the anvil such that the strap is drawn over the anvil in response to the collapse event;
   the strap being configured to cause a friction force to be created between the strap and the anvil so as to resist relative movement between the strap and the anvil during the collapse event;
   the strap being configured to cause a deformation force to be created between the strap and the anvil so as to resist relative movement between the strap and the anvil during the collapse event;
   the strap being configured such that at least one of the friction force and the deformation force varies along the length of the strap.

2. An assembly as set forth in claim 1, wherein the strap, is configured to exhibit a coefficient of friction that varies along the length of the strap.

3. An assembly as set forth in claim 1, wherein the thickness of the strap varies along the length of the strap.

4. An assembly as set forth in claim 2, wherein a surface finish of the strap varies along the lengthwise direction of the strap.

5. An assembly as set forth in claim 2, wherein a reduced friction region is disposed at a location along the length of the strap.

6. An assembly as set forth in claim 5, wherein the reduced friction region is coated with a low-friction material exhibiting a relatively low coefficient of friction.

7. An assembly as set forth in claim 6, wherein the low-friction material comprises PTFE.

8. An assembly as set forth in claim 5, wherein the reduced friction region exhibits a surface finish that provides a relatively low coefficient of friction.

9. An assembly as set forth in claim 5, wherein the reduced friction region is positioned so as to interacts with the anvil near an early stage of the collapse stroke.

10. An assembly as set forth in claim 5, wherein the reduced friction region is configured to provide only partial coverage of the width of the strap.

11. An assembly as set forth in claim 5, wherein the reduced friction region is configured such that a width of the region varies along a lengthwise direction of the strap.

12. An assembly as set forth in claim 2, wherein an increased friction region is disposed at a location along the length of the strap.

13. An assembly as set forth in claim 12, wherein the increased friction region is coated with a high-friction material exhibiting a relatively high coefficient of friction.

14. An assembly as set forth in claim 13, wherein the high-friction material comprises rubber.

15. An assembly as set forth in claim 12, wherein the increased friction region exhibits a surface finish that provides a relatively high coefficient of friction.

16. An assembly as set forth in claim 13, wherein the increased friction region is positioned so as to interacts with the anvil near a final stage of the collapse stroke.

17. An assembly as set forth in claim 12, wherein the increased friction region is configured to provide only partial coverage of the width of the strap.

18. An assembly as set forth in claim 12, wherein the increased friction region is configured such that a width of the region varies along a lengthwise direction of the strap.

19. An assembly as set forth in claim 18, wherein the width of the increased friction region is configured so as to provide a smooth transition toward increasing collapse resistance force.

20. An assembly as set forth in claim 1:
   wherein the strap is configured to provide a resistance force characteristic that is tailored for absorbing lesser levels of energy during earlier portions of the collapse stroke; and
   wherein the strap is configured to provide a collapse resistance force characteristic that is tailored for absorbing greater levels of energy during later portions of the collapse stroke.

* * * * *